(12) United States Patent
McClung et al.

(10) Patent No.: US 7,852,828 B2
(45) Date of Patent: Dec. 14, 2010

(54) EXTENDED TELEPHONY FUNCTIONALITY AT END POINTS

(75) Inventors: Michael H. McClung, Vienna, VA (US); Andrew J. Francke, Morgan Hill, CA (US); Ronald D. Higgins, Van Alstyne, TX (US); James R. Tighe, Frisco, TX (US); Jeffery A. Sanders, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 2143 days.

(21) Appl. No.: 10/214,034

(22) Filed: Aug. 7, 2002

(65) Prior Publication Data

US 2004/0028027 A1 Feb. 12, 2004

(51) Int. Cl.
*H04L 12/66* (2006.01)
(52) U.S. Cl. ............... 370/352; 370/401; 379/88.17
(58) Field of Classification Search ........... 370/352, 370/353, 354, 356, 493, 494, 401, 402, 403, 370/404, 405, 406, 465, 466; 379/88.17, 379/93.01, 93.09, 219, 220.01
See application file for complete search history.

(56) References Cited

U.S. PATENT DOCUMENTS

| | | | | |
|---|---|---|---|---|
| 5,933,476 A * | 8/1999 | Hansen et al. | ............. | 379/52 |
| 6,337,858 B1 * | 1/2002 | Petty et al. | ............. | 370/356 |
| 6,449,646 B1 * | 9/2002 | Sikora et al. | ............. | 709/226 |
| 6,480,484 B2 * | 11/2002 | Morton | ............. | 370/352 |
| 6,519,617 B1 | 2/2003 | Wanderski et al. | ............. | 707/513 |
| 6,600,736 B1 | 7/2003 | Ball et al. | ............. | 370/352 |
| 6,678,359 B1 * | 1/2004 | Gallick | ............. | 379/88.17 |
| 6,757,363 B1 * | 6/2004 | Platt et al. | ............. | 379/88.11 |
| 6,771,639 B1 * | 8/2004 | Holden | ............. | 370/352 |
| 6,788,769 B1 * | 9/2004 | Waites | ............. | 379/93.24 |
| 6,856,616 B1 * | 2/2005 | Schuster et al. | ............. | 370/352 |
| 6,885,737 B1 * | 4/2005 | Gao et al. | ............. | 379/93.17 |
| 6,950,501 B1 * | 9/2005 | Chaturvedi et al. | ............. | 379/52 |
| 6,973,091 B1 * | 12/2005 | Hester | ............. | 370/401 |
| 6,977,909 B2 * | 12/2005 | Minborg | ............. | 370/260 |
| 7,062,253 B2 * | 6/2006 | Money et al. | ............. | 455/406 |
| 7,075,921 B2 * | 7/2006 | Siegrist et al. | ............. | 370/352 |
| 7,136,461 B1 * | 11/2006 | Swingle et al. | ............. | 379/88.13 |
| 7,136,466 B1 * | 11/2006 | Gao | ............. | 379/93.23 |
| 7,149,506 B2 * | 12/2006 | Osterhout et al. | ............. | 455/417 |
| 7,325,029 B1 * | 1/2008 | Chang | ............. | 709/203 |
| 7,336,771 B2 * | 2/2008 | Crockett et al. | ............. | 379/88.03 |

(Continued)

FOREIGN PATENT DOCUMENTS

EP 0 833 488 A1 1/1998

(Continued)

OTHER PUBLICATIONS

W3C, Voice Extensible Markup Language (VoiceXML), Version 2, © 2002 W3C® (MIT, INRIA, Keio) (212 pages).

(Continued)

*Primary Examiner*—Chi H. Pham
*Assistant Examiner*—Kevin Mew
(74) *Attorney, Agent, or Firm*—Baker Botts L.L.P.

(57) ABSTRACT

A system includes telephony devices that provide services and applications through the execution of scripts in web pages.

28 Claims, 5 Drawing Sheets

U.S. PATENT DOCUMENTS

| | | | | |
|---|---|---|---|---|
| 7,502,993 | B1* | 3/2009 | Dodrill et al. | 715/205 |
| 7,586,898 | B1* | 9/2009 | Koch et al. | 370/352 |
| 7,593,355 | B1* | 9/2009 | Surazski et al. | 370/261 |
| 7,664,102 | B1* | 2/2010 | Samarasinghe | 370/352 |
| 2001/0003523 | A1* | 6/2001 | Crandall et al. | 370/352 |
| 2002/0126654 | A1* | 9/2002 | Preston et al. | 370/352 |
| 2002/0141404 | A1* | 10/2002 | Wengrovitz | 370/389 |
| 2003/0043974 | A1* | 3/2003 | Emerson, III | 379/88.13 |
| 2003/0058838 | A1* | 3/2003 | Wengrovitz | 370/352 |
| 2003/0133543 | A1* | 7/2003 | Khakoo et al. | 379/88.22 |
| 2003/0161448 | A1* | 8/2003 | Parolkar et al. | 379/88.17 |
| 2003/0215067 | A1* | 11/2003 | Ordille et al. | 379/88.13 |
| 2004/0005045 | A1* | 1/2004 | Adams et al. | 379/201.02 |
| 2004/0006623 | A1* | 1/2004 | Gourraud et al. | 709/227 |
| 2004/0062374 | A1* | 4/2004 | Lund | 379/218.01 |
| 2004/0141596 | A1* | 7/2004 | Crockett et al. | 379/88.17 |
| 2005/0073999 | A1* | 4/2005 | Koch | 370/352 |
| 2005/0185771 | A1* | 8/2005 | Benno et al. | 379/88.17 |
| 2005/0195802 | A1* | 9/2005 | Klein et al. | 370/352 |
| 2005/0265322 | A1* | 12/2005 | Hester | 370/352 |
| 2006/0047767 | A1* | 3/2006 | Dodrill et al. | 709/206 |
| 2006/0274721 | A1* | 12/2006 | Flanagan | 370/352 |
| 2008/0037729 | A1* | 2/2008 | Mobin et al. | 379/88.17 |
| 2009/0034695 | A1* | 2/2009 | Newton | 379/88.17 |

FOREIGN PATENT DOCUMENTS

| | | | |
|---|---|---|---|
| WO | WO 01/31900 | A2 | 5/2001 |
| WO | WO 01/91404 | A2 | 11/2001 |
| WO | WO 02/15501 | A1 | 2/2002 |
| WO | WO 02/19732 | A1 | 3/2002 |

OTHER PUBLICATIONS

PCT Notification of Transmittal of the International Search Report or the Declaration mailed Dec. 5, 2003, re PCT/US 03/24895 filed Jul. 8, 2003 (7 pages).

EPO Communication pursuant to Article 94(3) EPC for Application No. 03 785 068.2-2414, 8 pages.

The European Patent Office; Office Action on Application No. 03 785 068.2-2414; 3 pages, Feb. 5, 2009.

The Patent Office of the People's Republic of China on Appln. No. 03818787.6, Office Action, Issue Date Feb. 27, 2009, 13 pages.

The Patent Office of the People's Republic of China, Examiner's Second Office Action on Application No. 03818787.6, 16 pages; Chinese language and English translation included, Oct. 24, 2008.

Canadian Intellectual Property Office; Office Action for Application No. 2,493,780; dated Sep. 16, 2008; 2 pages.

The Patent Office of the People's Republic of China, Appln. No. 200810006109.0, Issue No. 2010030801355280, 12 pages, Mar. 11, 2010.

Notification of Reexamination from Patent Reexamination Board of the Chinese Patent Office, re Chinese Application No. 03818787.6 (8 pages), Jul. 6, 2010.

* cited by examiner

FIG. 6A

```
<tlc-web-feature>
   <control-script>
      <session>
         <invite variable-for-new-session-id="$C-PRIMARY-SID">
            <to>%DESTINATION</to>
            <media>
               <voice>
                  <type>default-voice</type>
               </voice>
            </media>
         </invite>
         <session-description session-id="$C-PRIMARY-SID">Initiating Call...</session-description>
      </session>
      <set-timer>
         <timer-name>INITIATING-CALL-TIMER</timer-name>
         <timer-duration>$G-INITIATING-CALL-DURATION</timer-duration>
      </set-timer>
   </control-script>
   <event-handlers life="this-page-only">
      <handlers>
         <session-events session-id="$C-PRIMARY-SID">
            <ok>
               <event-control-script>
                  <session>
                     <ack session-id="$C-PRIMARY-SESSION-ID"/>
                  </session>
                  <stop-timer>
                     <timer-name>INITIATING-CALL-TIMER</timer-name>
                  </stop-timer>
                  <next-page>
                     <URL>connected.xml</URL>
                     <parameter name="SESSION-ID">%SESSION-ID</parameter>
                  </next-page>
               </event-control-script>
            </ok>
            <session-error>
               <event-control-script>
                  <new-control-context>
                     <next-page>
                        <URL>popup-message-notification.xml</URL>
                        <parameter name="MESSAGE">$$E-ERROR-TEXT[$$E-ERROR-CODE]</parameter>
                     </next-page>
                  </new-control-context>
                  <session>
                     <ack session-id="%SESSION-ID"/>
                  </session>
```

120

122 {  (invite block)

124 {  (session-error block)

TO FIG. 6B

FROM FIG. 6A

```
<stop-timer>
    <timer-name>INITIATING-CALL-TIMER</timer-name>
</stop-timer>
<next-page>
    <URL>next-page-selector.xml</URL>
    <parameter name="WINDOW-ID">%WINDOW-ID</parameter>
</next-page>
            </event-control-script>
        </session-error>
    </session-events>
    <system-events>
        <!--it is the responsibility of the caller to time out if the call is not answered-->
        <system-timer timer-name="INITIATING-CALL-TIMER">
            <event-control-script>
                <session>
                    <cancel session-id="%SESSION-ID"/>
                </session>
                <next-page>
                    <URL>next-page-selector.xml</URL>
                    <parameter name="WINDOW-ID">%WINDOW-ID</parameter>
                </next-page>
            </event-control-script>
        </system-timer>
    </system-events>
</handlers>
</event-handlers>
</tlc-web-feature>
```

124 { (brace covering the above block)

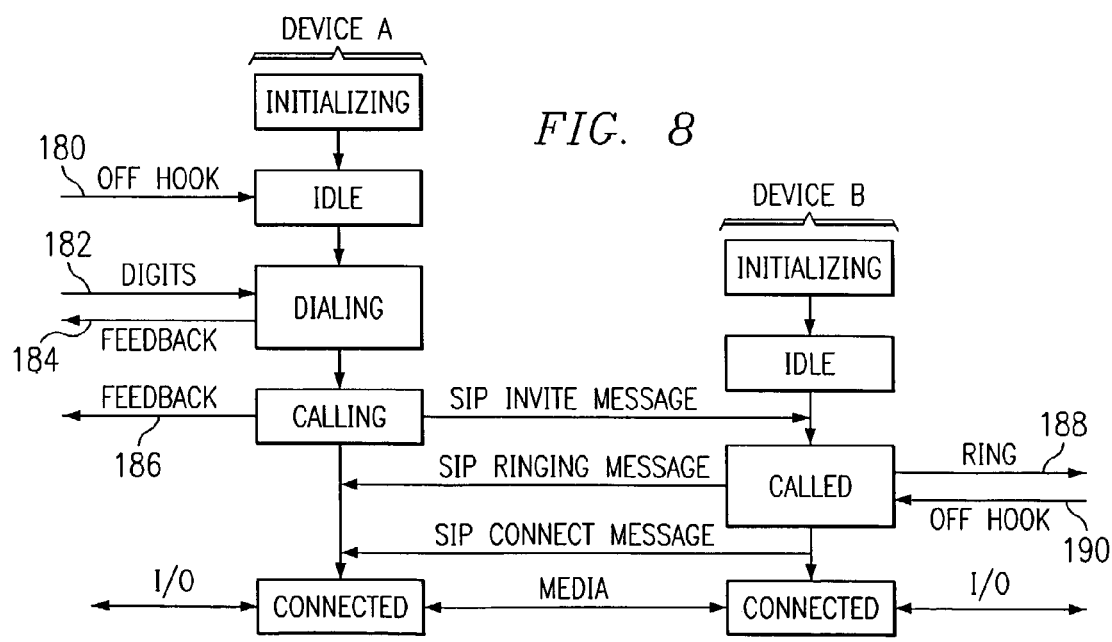

FIG. 8

EXTENDED TELEPHONY FUNCTIONALITY AT END POINTS

TECHNICAL FIELD OF THE INVENTION

The present invention relates generally to telephony communications and, more particularly, to providing telephony services using intelligent end points.

BACKGROUND OF THE INVENTION

As communications technologies rapidly develop, voice services and data services have increasingly converged. One such example is the use of Internet protocol (IP) technology to transport voice data. This enables voice traffic to gain the benefits of packet communication protocols. Similarly, other technologies can provide benefits when applied to telephony systems, yet discovering appropriate technologies and uses for these technologies remains a daunting challenge.

SUMMARY OF THE INVENTION

In accordance with the present invention, techniques for providing telephony services using intelligent end points are provided. According to particular embodiments, a distributed system provides telephony services, with end point devices processing telephony events using a variety of scripts that implement telephony services. More specifically, these scripts may be implemented in text-based languages and provided to end points using a web client/web server environment.

Embodiments of the invention provide various technical advantages. The distribution of functionality provides flexibility. Different components can handle more or less processing according to capabilities and/or system requirements. This distribution of functionality includes the shifting of processing into end points. The shift of processing into end points leverages on the increasing power of these devices. For example, the availability of powerful processing devices allows end points to provide services such as event processing and application services. End points can implement any suitable portion of the distributed functionalities according to system requirements. For example, while one system may use a central web server to provide scripts to remote web clients, another system may implement both the web server and web client within end points.

A web client/web server environment allows centralized control and rapid deployment of services. For example, an update within a web server will be virtually instantaneously reflected within the services provided by end points.

The scripting language supports an open standard for design and customization of telephony services. Moreover, these scripts may leverage upon technologies such as text-based languages, including extensible markup language (XML). These scripts allow for event processing to take place within end points rather than within centralized components.

The scripting language provides a development environment that accesses sufficiently low-level functionality of telephony devices without requiring any specific implementation of the functionality. For example, a script can manipulate call legs yet need not be concerned with underlying mechanisms effecting the operations. Thus, scripts developed to implement specific functions can be used on different devices, without regard for the specific mechanisms used by the devices to implement the underlying operations.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 6 illustrates an exemplary script for initiating a voice session;

FIG. 8 is a flow diagram illustrating events, messaging, and output for telephony devices establishing telephony communications.

DETAILED DESCRIPTION OF THE DRAWINGS

Figure 1:
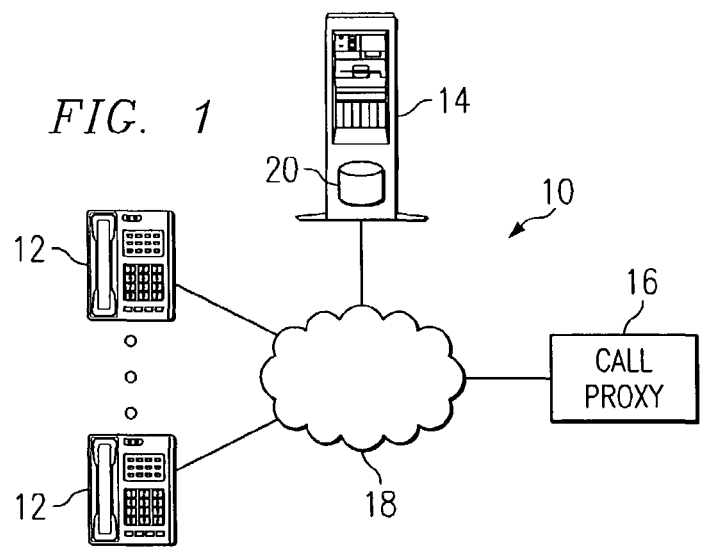
FIG. 1 illustrates a communication system including web clients and web servers that provide telephony services according to particular embodiments of the present invention.

FIG. 1 illustrates a communication system, indicated generally at 10, that includes telephony devices 12, a server 14, and a call proxy 16, with devices 12, server 14, and call proxy 16 interconnected and communicating using a network 18. In general, devices 12 provide telephony services by executing scripts. Each script, when loaded, implements a state within device 12 and provides for processing of telephony events. Device 12 enters new states by loading other scripts. The scripts provide for progression between states using links, and devices 12 and server 14 implement the loading and execution of scripts using a web client/web server environment. For example, each script may be an extensible markup language (XML) web page that implements a particular state for a telephony service and links to other web pages implementing other states. Device 12 operates by executing a particular web page and, in response to appropriate events, requesting and receiving additional web pages from server 14.

Device 12 represents any suitable combination and arrangement of hardware, including controlling logic, for providing telephony services by executing scripts that implement states. Specific functional modules of an exemplary device 12 are discussed in greater detail below with respect to FIG. 4. Server 14 and call proxy 16 also represent any suitable combination and arrangement of hardware and/or controlling logic operating to support telephony services provided by devices 12. In the embodiment illustrated, server 14 includes a memory 20 maintaining web pages for delivery to devices 12 in response to appropriate requests. Call proxy 16 acts as a message relaying and/or translating module for communications between elements of system 10.

Network 18 represents any suitable combination and arrangement of components supporting communications between devices 12, server 14, and call proxy 16. For example, network 18 may include local area networks (LANs), wide area networks (WANs), elements of the public switched telephone network (PSTN), portions of the Internet, and components in other suitable communications networks. Thus while a relatively simple embodiment is illustrated, system 10 contemplates devices 12, server 14, and call proxy 16 interconnecting using any number and type of communication links. For example, devices 12 may interconnect with other devices 12 using portions of the PSTN, while linking to server 14 using web-based communication networks. A particular embodiment showing specific links between elements is illustrated and described with respect to FIG. 2.

To provide telephony services, devices 12 load and execute web pages that implement states for the telephony services. Each web page includes a script, written in a text-based language, that manipulates lower-level functions of device 12 to implement a particular state. Each script contains instructions for device outputs and/or device operations. Device outputs include any information presented to a user, such as sounds, lights, and displays. For example, a script may turn on a flashing light emitting diode (LED) to indicate a waiting voicemail message. Device operations manipulate the operation of device 12 and communications with other elements. Device operations can generate messages to server 14, call proxy 16, and other devices 12. Device operations can further command internal operations, such as linking multiple call legs within a conference bridge, routing a call leg to a speaker, or initiating a timer.

Scripts also include event handlers that specify responses of device 12 to various events. Events include input from users, other devices 12, server 14, call proxy 16, and internal events. An event handler can link to another location within the script, link to another web page, or process the event. By linking to other web pages, events 12 can drive device 12 into new states, as device 12 retrieves and loads new web pages in response to the events.

As an example, consider web pages implementing the idling of device 12 and response to a user dialing a number. After appropriate initialization, device 12 loads a web page implementing an idle state. In this state, the script in the web page may provide various outputs, such as a feature display and, if appropriate, a message waiting indication. In response to a user picking up the receiver, device 12 process this off-hook event using the loaded web page (the "idle page"). The idle page thus attempts to find an event handler that matches to the off-hook event. In this example, an "off-hook event handler" in the idle page links to another web page for dialing. Thus in response to the event, device 12 retrieves and loads the dialing web page and executes the script in the loaded web page.

The new script in the dialing web page commands device operations, such as activation of a tone generator, as well as device outputs, such as providing the generated tone through a speaker and visually indicating the off-hook state in a display. The script further includes an event handler for responding to dialed digits. For example, the event handler can, for each digit, display the dialed digit, initialize a timeout timer, and perform digit analysis on the sequence of dialed digits. Upon identifying a number to call, the digit event handler then links to another web page for contacting the called party. In this manner, the states of device 12 progress in response to events. However, the preceding example is merely illustrative and is not intended to limit the scope of techniques for implementing similar functionality within device 12 using web pages.

During operation, server 14 and call proxy 16 support devices 12. Server 14 provides a centralized repository of web pages for use by devices 12. Server 14 communicates the web pages from memory 20 to devices 12 in response to web page requests. The centralization of web pages within server 14 facilitates rapid deployment of updates and upgrades, in addition to various other advantages.

Call proxy 16 mediates communications between devices 12 and between devices 12 and other types of telephony equipment. To perform this mediation, call proxy 16 relays events to and from devices 12 and, if necessary, translates between various protocols. According to particular embodiments, call proxy 16 handles session initiation protocol (SIP) subscription and notification routines for communications with devices 12, while handling traditional telephony signaling with other equipment, such as traditional telephones. For example, call proxy 16 may support a telephone call between device 12 and a traditional telephone device using SIP messaging with device 12 and traditional telephony messaging with the other device, while performing various translations between the protocols. According to particular embodiments, call proxy 16 further supports communications by building and maintaining routing tables for directing calls. These routing tables permit call proxy 16 to match dialed digits to the addresses for reaching an end point associated with the dialed digits.

However, while the figure and preceding description illustrate a particular separation of functionality between devices 12, server 14, and call proxy 16, system 10 contemplates any suitable distribution of functionalities between various components, so long as devices 12 provide telephony services by loading and executing web pages implementing states. Thus, some or all of the functionality of server 14 and/or call proxy 16 may be incorporated into one or more devices 12. For example, devices 12 may locally maintain web pages for a number of services, while server 14 maintains web pages implementing more complex services or for periodic updates of devices 12. Moreover, devices 12 may build and maintain routing tables and provide other functions of call proxy 16.

Figure 2:
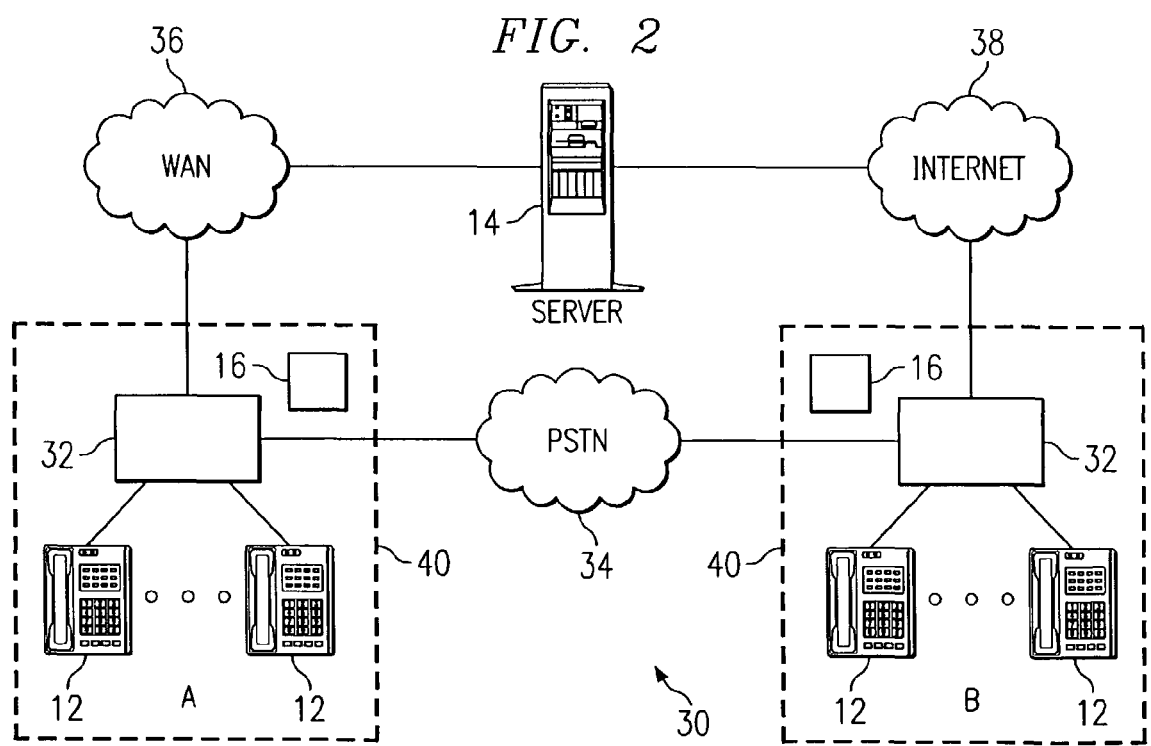
FIG. 2 is a block diagram illustrating an exemplary communication system having web clients communicating using various networks and elements with other web clients and a web server.

FIG. 2 illustrates a particular arrangement of devices 12 and server 14 within a system, indicated generally at 30, that links devices 12 and server 14 using gateways 32, PSTN 34, a WAN 36, and Internet 38. At each of two sites 40, labeled A and B, devices 12 use gateways 32 to link with outside networks. At site A, gateway 32 links to WAN 36 and PSTN 38. At site B, gateway 32 links to PSTN 34 and Internet 38. Thus, system 30 illustrates a particular embodiment in which devices 12 link to server 14 using various networks and further link to each other across separate networks.

Gateways 32 represent network equipment, such as routers or switches, operating to route and/or translate communications. In the embodiment illustrated, each site 40 includes gateway 32 linking devices 12 to various networks. Each site 40 further includes call proxy 16 for directing messages to PSTN 34 and for handling messages received from PSTN 34. However while shown as a separate element, each gateway 32 may implement some or all of the functionality of call proxy 16, or each device 12 may implement some or all of this functionality.

During operation, devices 12 load and execute web pages, either by retrieving the web pages from local storage or from server 14. Thus as shown in this illustration, devices 12 can retrieve web pages using any suitable communication links, such as over WAN 36 or Internet 38. Through the execution of these web pages, devices 12 establish communication sessions with each other or with other types of end points. However, while devices 12 may retrieve web pages using one communication network, actual communication sessions established with these web pages may take place over different networks. For example, while devices 12 may communicate with server 14 over web based networks, devices 12 may establish and carry on communications across PSTN 34.

Consider device 12 within site A (device A) placing a call to device 12 within site B (device B). To implement the various states of dialing and connecting, device A and device B request web pages from server 14, device A through WAN 36 and device B through Internet 38. Communications between device A and device B may then take place across PSTN 34. For example, the loaded web pages may command various signaling that is communicated between device A and device B across PSTN 34. However, system 30 and the preceding description and examples illustrate only a particular embodiment for interconnecting devices 12 and are not intended to limit the scope of the disclosed concepts.

Figure 3:
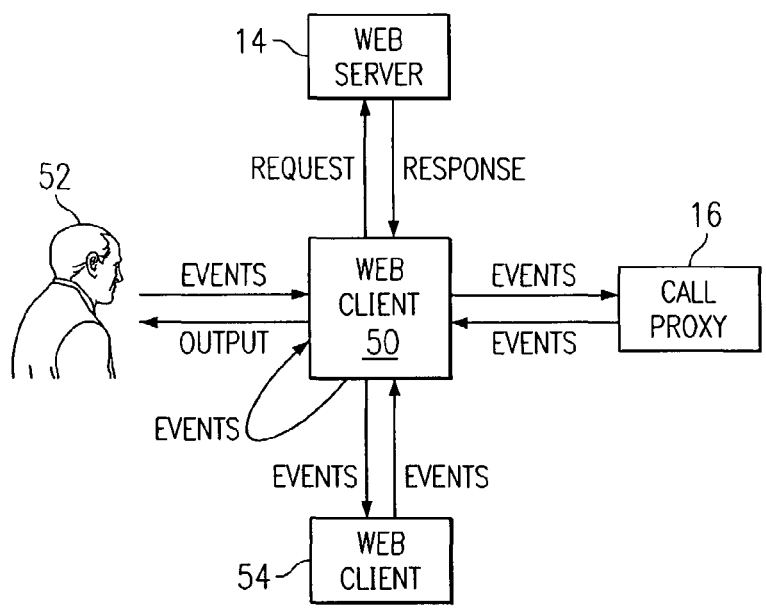
FIG. 3 is a block diagram illustrating communications for an exemplary web client of the system.

FIG. 3 is a block diagram illustrating interactions of the elements that facilitate call processing within devices 12. These elements include a web client 50 which operates within device 12, server 14, and call proxy 16. As shown in this diagram, web client 50 can receive events from itself, a user 52, call proxy 16, and another web client 54. Web client 50 also generates and communicates events to itself, other web client 54, and call proxy 16. Web client 50 further generates output for delivery to user 52.

To obtain a web page, client 50 communicates a web page request to server 14, and in response, receives the requested page. For example, in response to a received connection request event, an event handler of a current loaded web page may indicate a new web page for handling the connection request. Thus, in response to the connection request, web client 50 drives to a new state by requesting and loading a web page from server 14.

Web client 50 requests and loads web pages from web server 14 and performs other activities in response to various events. As shown by this example, these events may come from user 52, call proxy 16, and other web clients 54. From a user 52, web client 50 receives events such as off-hook and on-hook, dialed digits, and features selections. From call proxy 16, web client 50 receives events relayed from other devices 12, events from traditional telephony devices, and other appropriate events. For example, from call proxy 16, web client 50 may receive a SIP notification of an incoming call. Web client 50 may also receive events directly from other web clients 54. For example, other web client 54 may communicate a call notification message directly to web client 50. Thus, devices 12 can operate without centralized control to provide telephony services to users.

Web client 50 also generates and communicates events and other messages to other elements, such as web server 14, call proxy 16, other web clients 54, and users 52. As previously discussed, web client 50 obtains web pages from web server 14 by generating and communicating web page requests. To communicate with other devices 12 and/or other types of telephony devices, web client 50 communicates events to call proxy 16. For example, in response to a call notification event received from call proxy 16, web client 50 may communicate an connect message back to call proxy 16 upon receiving an off-hook event from user 52. In addition to communicating with other devices through call proxy 16, web client 50 may also communicate events directly to other web clients 54. Web client 50 may additionally generate events for processing by itself. For example, web client 50 may set a timer that can generate an event. For example, while receiving dialed digits from user 52, web client 50 may set a timer. If the timer expires after receiving a dialed digit but before an actual telephone number has been indicated, web client 50 may receive a timer event and, in response, generate a fast busy tone to indicate the time out to user 52.

As previously discussed, the functionalities provided by web client 50, server 15, and call proxy 16 may be divided or combined as appropriate, so long as devices 12 retain the ability to provide telephony services using a series of web pages implementing states. Thus, device 12 can, in addition to web client 50, include some or all of the functionalities of server 14, and/or call proxy 16. Therefore, some or all of the interactions illustrated in this diagram may take place within devices 12.

Figure 4:
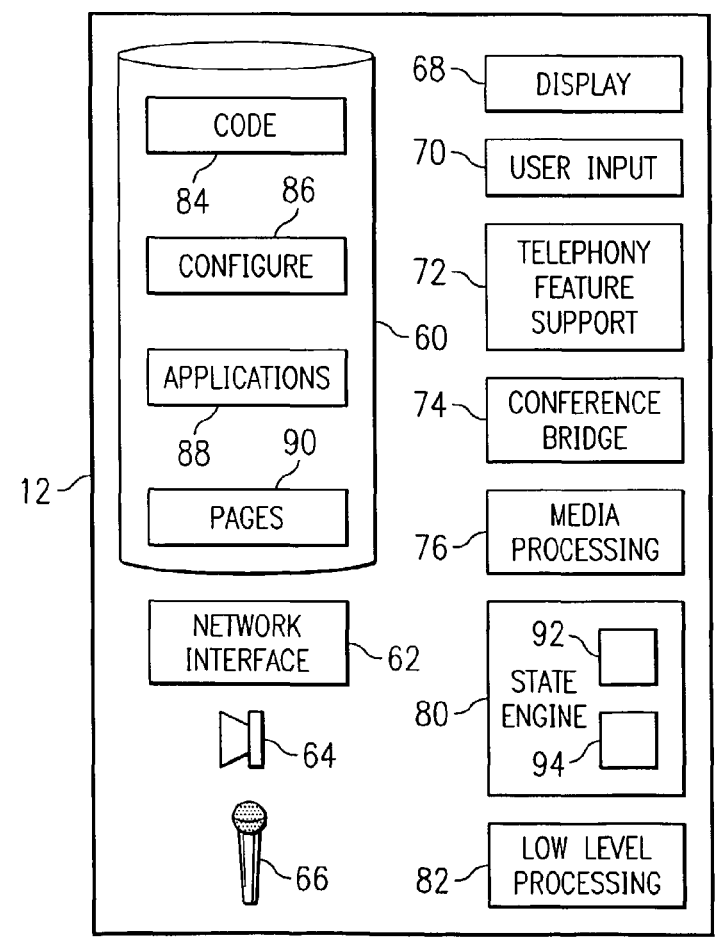
FIG. 4 is a block diagram illustrating exemplary functional components of a web client of the system.

FIG. 4 is a block diagram illustrating exemplary functional components of device 12, which includes user interface modules, processing modules, a memory 60, and a network interface 62. The user interface modules include a speaker 64, a microphone 66, a display 68, and a user input interface 70. Processing modules include a telephony feature support module 72, a conference bridge 74, a media processing module 76, a state engine 80, and a low level processing module 82.

The user interfaces provide for the exchange of information with users of device 12. Speaker 64 generates audio signals, and microphone 66 receives and processes audio signals from a user. Through display 68, device 12 presents information to a user. For example, display 68 may include LEDs, graphical displays and other devices for visually displaying or otherwise presenting information. User input interface 70 represents any suitable elements for receiving input, other than audio signals, from a user. For example, user input interface 70 may include a number keypad, buttons referencing to portions of display 68, a pointing device, and other appropriate input interfaces.

Network interface 62 provides for communications between device 12 and other equipment. For example, network interface 62 may link to gateway 32 and provide for packet-based voice communications. However, system 10 contemplates devices 12 coupling to any suitable communications equipment using any appropriate techniques and protocols. Thus, network interface 62 supports any appropriate wireless and/or wireline communications protocol.

Memory 60 represents any suitable data storage element and, in the embodiment illustrated, maintains code 84, configuration data 86, applications 88, and web pages 90. Code 84 represents logic executed by various elements of device 12 to implement features and functionality. For example, code 84 may include logic used by state engine 80 to interpret and execute scripts. Configuration data 86 represents settings and other information for use by device 12 during initialization and operation. For example, configuration data 86 may identify a particular server 14 from which device 12 should request web pages. Applications 88 include media and/or programs for use by device 12 to locally host telephony applications. For example, applications 88 may include media processing software, such as voice recognition programs. Media maintained within applications 88 can include data such as user recorded prompts for voicemail applications, messages from other users, and other appropriate information. Device 12 uses the information within applications 88 in conjunction with suitable web pages to locally host telephony applications such as voicemail and auto attendant. Web pages 90 represent locally maintained web pages for execution by state engine 80. For example, device 12 may maintain a limited set of commonly used web pages within memory 60 and then request other web pages from server 14 through network interface 62.

Low level processing module 82 provides underlying management and control of the operation of device 12. For example, in response to commands from state engine 80, low level processing module 82 may link call legs from network interface 62 to other modules within device 12. Low level processing module 82 provides its functions in response to commands native to the particular device 12. That is, various devices 12 may operate using different types of commands.

Media processing module 76 provides manipulation and enhancement of signals. According to particular embodiments, media processing module 76 includes digital signal processing capability for compression, echo cancellation, silence detection, and other appropriate signal processing. Conference bridge 74 supports the conferencing, within device 12, of communications with multiple parties. For example, state engine 80 may command low level processing module 82 to link multiple call legs from network interface 62 to conference bridge 74. Conference bridge 74 may then perform conferencing functions with respect to these multiple call legs. This allows device 12 to support conferencing, a feature traditionally provided by central servers. Feature support module 72 handles telephony infrastructure primitives, such as timers, tone generation, and other support functions.

State engine 80 manages and controls the operation of device 12 by loading and executing web pages with text base scripts. Since these scripts may implement both device output and device operations, state engine 80 includes an output processing module 92 and an operations processing module 94. During operation, state engine 80 loads and executes web pages, either retrieving these pages from memory 60 or from server 14 as appropriate. In performing the activities detailed within the script of a loaded web page, output processing module 92 handles commands that interact with various user interfaces, while operations processing module 94 handles commands instructing the operation of various processing modules. However, because some commands may touch both processing and interface modules, output processing module 92 and operations processing module 94 may work in tandem to effect the procedure implicated by a command. For example, these modules may work together to establish the output of information from a received call leg using speaker 64.

In executing scripts within web pages, state engine 80 also processes events using event handlers within the web pages. For example, upon detecting an event, state engine 80 may access the loaded web page to determine whether it contains an event handler for the detected event. If so, state engine 80 responds to the event according to the instructions within the event handler. Thus, in operation, state engine 80 acts as an enhanced web browser to drive the display, features, and call control by executing scripts.

During operation, device 12 may load and execute web pages that implement various states of telephony applications such as messaging, personal assistant, auto attendant, "hoteling," and emergency access response. Through the execution of these web pages, device 12 provides locally hosted telephony applications. Messaging applications support functions such as voicemail, text messaging, and other appropriate functions. Personal assistant applications allow one or more end points to intelligently respond to various telephony and messaging events. For example, personal assistant applications can allow users to specify rules and responses for customizing the operation of a particular device 12 to events, such as an incoming call. Auto attendant applications provide services such as voice access to a directory for multiple extensions of an organization. Hoteling applications support services of users that do not have a primary end point, such as a primary one of devices 12. Emergency access response application permit devices 12 to appropriately interact with emergency services, such as emergency 911 services. Regardless of the type of application, the flexibility afforded by implementing telephony services using a series of web pages permits these applications to be hosted within any appropriate equipment, such as devices 12, gateways within various networks, and other suitably enabled equipment.

To provide telephony applications within devices 12 without requiring servers, devices 12 may support a number of operations. Without the aid of a central server, end points and other supporting equipment should handle functions to provide fault tolerance. For example, if devices 12 within system 10 provide locally hosted voicemail services for users, the unavailability of a particular device 12 could result in the loss of voicemail services for an associated user during the unavailability of device 12. To overcome this problem, the calling end point (or gateway providing access to) device 12 may detect the unavailability of device 12 and provide interim voicemail services.

For example, a user of one device 12 places a call to another, unavailable device 12. Upon detecting the unavailability of the called device, the calling device prompts the user for a voicemail message to be delivered to the unavailable device at a later time. The calling device 12 then stores this voicemail message until the called device 12 is available, at which time it delivers the message.

To perform functions such as these, devices 12 support "presence" and "liveness" awareness. Presence indicates the availability of a user or services for a user. For example, a particular user may be associated with multiple devices 12. That user is not present only if all of the associated devices 12 are unavailable. Liveness indicates the availability of a particular device 12.

To support robust and sophisticated delivery of telephony applications to users, devices 12 permit users to associate with multiple devices 12 and/or to roam to other devices 12 through techniques such as logins. For example, if a user has a telephone at work and a telephone at home, both of them may run a personal assistant that implements rules to handle incoming calls. These rules may specify actions such as ring types, forwarding rules, and other appropriate operations. However, only one of these phones, such as the work phone, should be designated as a master application for functions such as messaging. Thus when receiving a call, both telephones respond in a similar fashion, yet only the master application phone will provide voicemail if a call is not answered. If the master telephone becomes unreachable, one of the other associated telephones may temporarily take over as the master application. To achieve this fallback capability, devices 12 use liveness awareness.

According to particular embodiments, devices 12 execute commands at the request of other devices 12 in order to support end point hosting of applications. For example, a calling device 12 may send web pages to a called device 12 to control the display presented to a user. Similarly, a calling device 12 may send call control web pages to a called device 12. System 10 contemplates devices 12 exchanging these web pages using any suitable techniques. For example, devices 12 may communicate web pages directly to other devices 12 using hyper-text transfer protocol (HTTP). Alternatively or in addition, devices 12 may exchange links to web pages. For example, in response to receiving a link from a suitably verified device 12, a receiving device 12 may load the identified web page from local memory or from a remote server 14 as appropriate.

For example, consider one end point placing a call to another end point. Upon detecting a call invite message from the calling end point, the called end point begins ringing and sets a timer according to user configurations specifying a wait time before auto-answering. When the timer triggers, the called end point answers the call and communicates a web page to the calling end point. This web page can include information such as user interface commands for presenting various messaging options to the user of the calling end point. The called end point can customize these options based on the identity of the calling end point. For example, if a good friend is calling, the options may allow the calling end point to contact the called user at another location, while for other people, the options only allow the calling end point to leave a voicemail message. In this fashion, end points can support applications by controlling each others operation through the exchange of web pages, links, scripts, or other suitable controlling commands.

However, while the embodiment illustrated and the preceding description focus on a particular embodiment of device 12 that includes specific elements, system 10 contemplates device 12 having any suitable combination and arrangement of elements providing telephony services through the execution of web pages. Thus, the functionalities performed by the particular elements illustrated may be separated or combined as appropriate, and the functionalities of some or all of these elements may be implemented by logic encoded in media. Moreover, while specific examples are provided to illustrate the operation of particular embodiments, these examples are merely illustrative and are not intended to limit the scope of the disclosed concepts.

Figure 5:
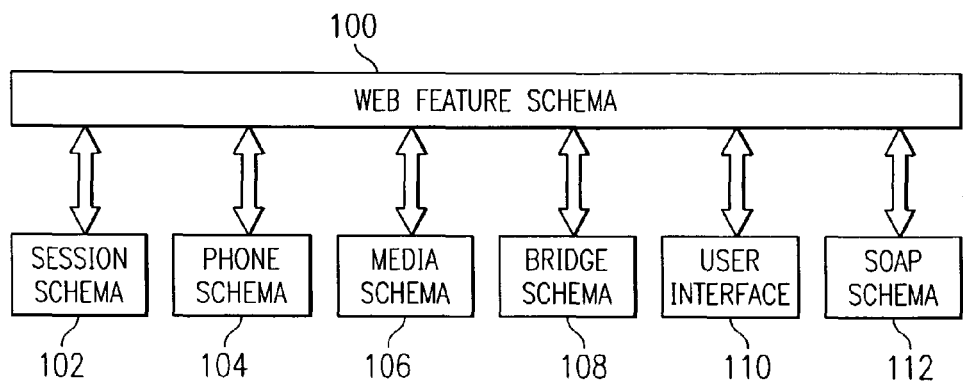
FIG. 5 is a block diagram illustrating a distribution of modules, within a web client, that process scripts to provide telephony services.

FIG. 5 is a block diagram illustrating a group of related schemas that implement processing of scripts within device 12. These schemas include a web feature schema 100 that links with a session schema 102, a phone schema 104, a media schema 106, a bridge schema 108, a user interface schema 110, and a SOAP schema 112. These schemas and the underlying text commands forming the schemas define a telephony service creation mark-up language. That is, the schemas define the syntax of a web-based language for scripting the operation of telephone end points, such as devices 12. The language leverages the web model and web techniques to support telephony service development and deployment. Whether accessed locally or remotely through server 14, the language enables functionality of device 12 to be completely scripted. Thus, while the underlying operation of lower level functions within different devices 12 may be different, common web pages may be used by these devices 12. For example, as previously discussed, devices 12 may include personal computers, wireless devices, personal digital assistants, and other suitable equipment. Therefore, the actual mechanisms used to process and support telephony services within these devices may vary widely. However, the common language and schema definitions allow each device 12 to provide telephony services using a common set of web pages despite their underlying differences.

Each schema defines primitives for accessing various low level functions of devices 12. For example, the schemas may provide primitives for creating soft buttons, displaying a list, initiating a multicast session, testing local state variables, looping through an array, creating a set of elements, bridging a session's media to a speaker or a file, creating a whisper mode media connection, performing digit analysis on a number, storing a session identifier, or playing a fast busy tone. These primitives are accessible through text based tags within the scripts.

The schemas illustrated each support various types of telephony services. In general, each schema handles tags and groups of tags for commands and events. Session schema 102 supports the creation and management of communication sessions. Session schema 102 may provide interoperability with session initiation protocol (SIP) communications by handling tags that correspond to SIP operations. According to particular embodiments, session schema 102 handles tags that support the following operations: register, invite, refer-invite, reinvite, info, okay, acknowledge, cancel, bye, error, redirect, proxy, notify and subscribe. Moreover, session schema 102 may handle tags for the following events: invite, okay, acknowledge, cancel, bye, hold, reinvite, refer-invite, information, error, redirect, notify, and subscribe. The handling of similar tags with reference to both operations and events illustrates the dual nature of these commands. For example, an operation to invite another end point to participate in a voice session may result in device 12 communicating a SIP invite message to the identified end point. An event for invite, on the other hand, responds to the receipt of an invite message from another end point.

Phone schema 104 supports the management and control of device 12. According to particular embodiments, phone schema 104 handles tags for the following commands: set ring type, set ring volume, set speaker volume, set microphone volume, and set the message waiting indicator. Moreover, phone schema 104 handles tags for the following events: hook status (off-hook or on-hook) and dialing.

Media schema 106 supports the manipulation of underlying media streams. According to particular embodiments, media schema 106 handles tags for the following commands: starting and stopping media streams and playing tones and messages. In addition, media schema 106 handles tags for the following events: stream events (such as start and stop of a media stream), dual-tone multifrequency (DTMF) events, media timing events, and media errors.

Bridge schema 108 facilities the mixing or separation of media. According to particular embodiments, bridge schema 108 handles tags for splitting, joining and monitoring media streams. A split command specifies that media be split from a conference. The media split can be either a one-way or a two-way stream. For example, a two-way selection may represent a bi-directional stream set up for a communication session, or microphone and speaker stream. A one-way stream may be a source, such as a microphone or a file, or a sink, for example, a speaker or a file. The join command specifies that media be joined to a conference. The monitor command specifies mixing rules for a conference within the context of a specific line or within the context of device 12. According to particular embodiments, bridge schema 108 supports monitoring commands for silent monitoring, whisper, and conference.

User interface schema 110 handles tags supporting the display of output by device 12. For example, user interface schema 110 may handle tags for displaying text boxes, window selectors, context selectors, line selectors, session selectors, and on-hold session selectors. User interface schema 110 may further support tags for commands such as title displays, status displays, soft buttons, prompts, queries and other appropriate interface commands.

The schemas handled by device 12 may further be extended to provide support for any number of features and protocols. For example, in the embodiment illustrated, the inter-related schemas include SOAP schema 112, which supports simple object access protocol (SOAP) operations. SOAP schema 112 could, for example, provide mapping between text-based tags and SOAP operations to permit the addition of complex features, such as a stock ticker, using relatively simple text-based commands.

While each of schemas 102 through 112 provide support for specific types of operations and events, web feature schema 110 provides base line operations and for interactions between the various schemas. For example, web feature schema 100 may support timers, loops, conditional statements, threads, variables and other operational support. During operation, web feature schema 110 provides for control flow and signaling hooks to implement applications and features with other child schemas. According to particular embodiments, web feature schema 110 handles tags for the following commands: create and close a control context, create and close a line, send a user-defined signal for inter-context communications, subroutine, exceptions, timer, load page, manage window (create, raise, lower, or close window), allocate or deallocate variable, set or check variable, and diagnostics. In addition, web feature schema 110 handles tags for the following events: user-defined signal and notification of illegal web page. For example, in response to create context commands, web feature schema 110 may handle the creation of a context for a telephone communication session. Within this context, web feature schema 110 further handles variables, subroutines, timers, page loading, and other base line operations.

The illustration and preceding description demonstrate an exemplary distribution of processing features among schemas, while highlighting the power of a web-based language to implement telephony services. The language provides flexibility and extensibility, with a level of abstraction that permits access to relatively low-level device operations without limiting the underlying hardware or implementation of these operations. However, the particular example illustrated, which provides for a specific distribution of functions among schemas, is provided only as an example, and is not intended to limit the scope of the disclosed concepts.

FIG. 6 illustrates a script 120 that, when executed by device 12, enables initiation of a voice session. In the embodiment illustrated, script 120 includes an activity section 122 that implements various actions and an event-handling section 124 that implements event handlers. In activity section 122, script 120 includes commands that invite a destination to participate in a voice session and initiate a call timer. Within event handler section 124, script 120 provides event handlers for events such as a successful connection or an error during connecting. However, while script 120 illustrates a particular method for initiating a voice session using particular commands, the example provided is merely illustrative and is not intended to limit the scope of the disclosed concepts.

Figure 7:
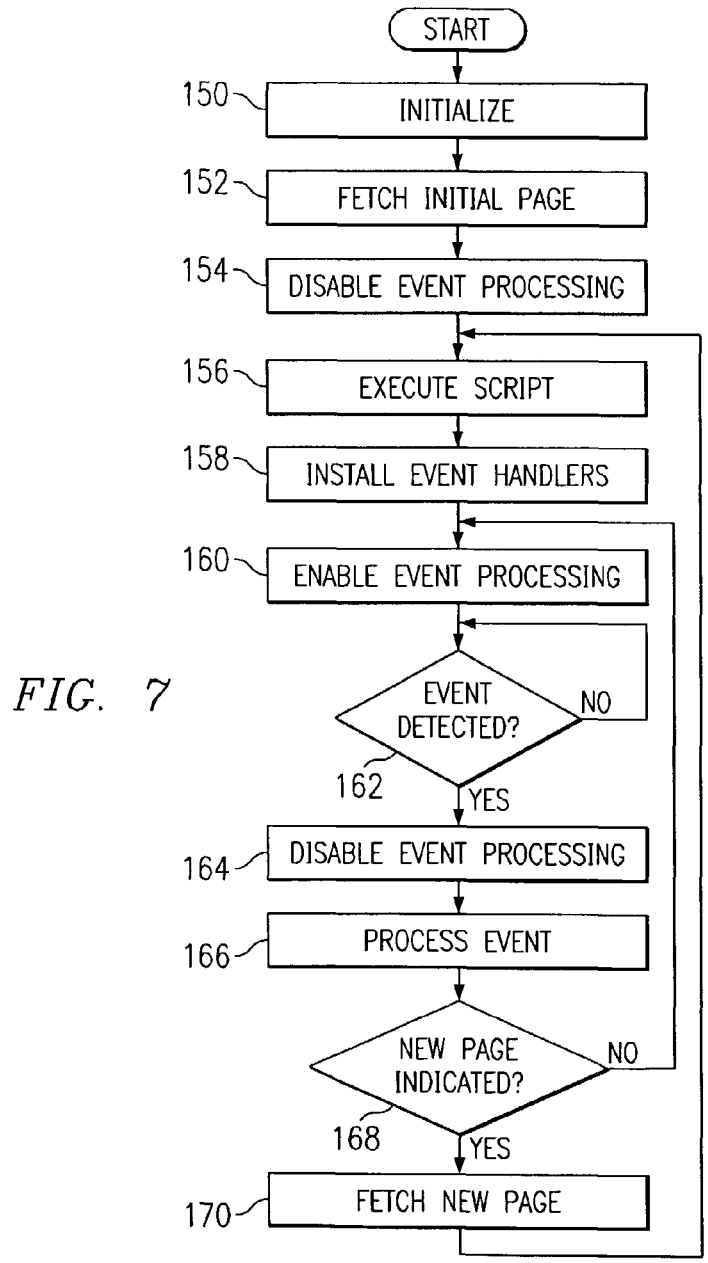
FIG. 7 is a flowchart illustrating a method for processing scripts to provide telephony services.

FIG. 7 is a flowchart illustrating a method for device 12 to process web pages to provide telephony services. Device 12 initializes at step 150. For example, on power-up, device 12 may load code and configurations that identify settings and an initial web page on a remote server 14. Device 12 fetches the initial page at step 152. As previously discussed, device 12 may locally maintain some or all web pages for use in providing telephony services. Thus, this initial page may be maintained within device 12 and specify start up procedures and other appropriate initialization routines.

Device 12 disables event processing at step 154. This prevents events from disrupting script execution. Device 12 executes the script on the loaded web page to perform the commanded activities at step 156. After executing the activities detailed within the script, device 12 installs the event handlers of the web page at step 158 and enables event processing at step 160. Thus, in operation, device 12 will often execute the activities within a script from start to finish without interruption or delays.

Device 12 monitors for events at step 162. Upon detecting an event, device 12 processes may disable event processing at step 164 and then process the event at step 166 using the event handlers from the loaded web page. As previously discussed, the event handler chosen to process the event can perform actions to handle the event, link to another location within the loaded web page, and/or link to another web page. If device 12 determines, at step 168, that a new page is indicated by the event handler, device 12 fetches the new page at step 170. After fetching and loading the new web page, device 12 processes the page using the procedure described above.

Thus, the preceding flowchart and accompanying description illustrate a relatively simple method for processing web pages that implement states providing telephony services. However, this flowchart is provided only as an illustrative example, and system 10 contemplates devices 12 using any suitable techniques for processing web pages implementing states for telephony services. Thus, many of the steps in this flowchart may take place simultaneously and/or in different orders than as shown. Moreover, device 12 may use methods with additional steps, fewer steps, and/or different steps, so long as the method remain appropriate.

For example, in this flowchart, the disabling and enabling of event processing prevents received events from disrupting execution of activities within a script. However, the language implementing telephony services using web pages contemplates the management and control of multiple contexts, and for the use of sub-states within each context. To implement these various contexts and sub-states, the language contemplates the use of nested web page executions. For example, during the execution of activities for a first web page, multiple sub-states for the web page may be implemented by executing two or more nested web pages. Sub-states provide a mechanism for managing the inherent complexity associated with telephony applications.

An exemplary implementation of a telephone park feature illustrates the use of sub-state processing to provide a telephony feature. A first page provides for general control of the park feature, while two sub-state web pages implement processing for: 1) obtaining the appropriate number for "parking" a telephone call, and 2) transferring the telephone call to the selected number. Thus, during execution, device 12 will branch from the main control page into the "get park number" web page, and, after completing execution of the get park number web page, will branch into the transfer web page. This type of service implementation using lower level web page building blocks allows for the reuse of web pages implementing modular services. For example, the transfer web page may handle transfer events and, as illustrated by the previous example, be incorporated as a sub-state within other services.

FIG. 8 is a flow diagram illustrating the states and events for two devices 12 (device A and device B) during the establishment of a communication session. After starting up, device A and device B each proceed through an initialization state into an idle state. For example, through the loading and execution of one or more web pages, devices A and B arrive at an idle state in which they await events. This idle state is provided by a web page specifying event handlers for responding to various conditions.

Device A receives an off-hook notification at 180. Device A may, for example, receive this off-hook notification as a result of a user lifting a receiver from a cradle. Device A process the off-hook event using the idle web page event handlers and identifies a dialing web page to handle the event. Thus, device A enters the dialing state by fetching and loading the appropriate web page. In the dialing state, device A receives digits at 182 and provides feedback at 184. For example, using a key pad, the user may dial digits and, in response, device A may generate tones and display the numbers dialed. During the dialing state, device A may further perform digit analysis using the digits received from the user.

Upon determining that device A has dialed digits identifying device B, device A loads a calling web page implementing activities for contacting device B and events for handling responses. During script execution, the calling web page provides for the transmission of a SIP invite message to device B. In addition, during execution of the calling web page, device A may provide feedback to the user, such as ringing tones, at 186. After sending the SIP invite message to device B and while providing appropriate feedback to the user, device A awaits a response from device B or a timeout event.

Device B receives the SIP invite message and processes this event using the event handlers of the loaded idle web page. In the embodiment illustrated, the event handler of the idle web page within device B links to a called web page for handling the invite message. Thus, device B loads the web page for handling the called state. In executing the called web page, device B replies to the invite message from device A by communicating a SIP ringing message to device A. During execution of the called web page, device B further provides a ring at 188. In response to the ringing, a user of device B answers the call, providing an off-hook event at step 190. In response to this event, the called web page of device B communicates a SIP connect message, such as a SIP OK message, to device A. Device A and device B each then proceed to a connected state in which media is streamed between the devices and input and output is communicated with the user.

However, the flow diagram and accompanying description illustrate only an exemplary method of operation, and system 10 contemplates devices 12 loading and executing any suitable web pages implementing various states to support the establishment of communications between devices 12. Thus, the described states are merely illustrative, and the loaded web pages may provide for additional states, fewer states and/or different states.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for hosting telephony applications within end points, the method comprising:
   receiving a call invite message at a called end point, the call invite message generated by a calling end point requesting a voice communication session with the called end point; and
   in response to the receipt of the call invite message by the called end point, wherein the called endpoint comprises a first web page loaded on the called endpoint and the first web page comprises a script that includes an event handler to implement a state for call processing:
   determining a state of the calling end point by the called endpoint; and
   executing, by the called endpoint, the event handler to communicate a second web page associated with the state of the calling end point from the called end point to the calling end point;
   wherein the state is associated with an event of the communication session and the second web page specifying user interface commands is associated with the state of the calling end point for execution by the calling end point to present information to a user of the calling end point and to provide locally hosted telephony applications through the execution of the second web page.

2. The method of claim 1, wherein:
   the user interface commands indicate a plurality of options; and
   the second web page further specifies a plurality of event handlers corresponding to the options, each of the event handlers operable to communicate an event in response to a selection of a corresponding option.

3. The method of claim 2, further comprising:
   receiving a selected event from the calling end point in response to the user selecting one of the options, the selected event indicating the selected option;
   identifying an event handler of a loaded web page corresponding to the selected event; and
   executing the event handler of the loaded web page.

4. The method of claim 2, wherein the options comprise a hang up option and a leave message option.

5. The method of claim 4, further comprising:
   communicating a call connect message to the calling end point;
   establishing the voice communication session with the calling end point;
   receiving an event from the calling end point corresponding to selection of the leave message option;
   identifying a message prompt;
   communicating the message prompt to the calling end point;
   receiving an audio stream from the calling end point through the voice communication session; and
   recording the audio stream.

6. The method of claim 5, wherein the message prompt comprises an audio file.

7. The method of claim 5, further comprising, in response to receiving the event, communicating a third web page to the calling end point, the third web page comprising user interface commands for presenting message options to the user.

8. The method of claim 1, further comprising:
   identifying an identity of the calling end point;
   customizing the user interface commands to indicate a plurality of options based on the identity of the calling end point; and
   customizing the second web page to include a plurality of event handlers corresponding to the options, each of the event handlers operable to communicate an event in response to a selection of a corresponding option.

9. The method of claim 1, further comprising:
   handling the call invite message using a call invite event handler in the script of the first web page loaded on the called endpoint, the call invite event handler including a link to a called web page;
   loading the called web page on the called endpoint, the called web page commanding output indicating an incoming call and initiating a timer for detecting failure to respond to the call;
   receiving a timeout event based on triggering of the timer;
   handling the timeout event using a timeout event handler of the called web page, the timeout event handler linking to a no-answer web page;

loading the no-answer web page, the no-answer web page specifying the communication of the web page to the calling end point.

10. A telephony device comprising:
a speaker operable to generate audio output;
a microphone operable to receive audio input from a user;
a display operable to present information to the user;
a user interface operable to receive indications from the user;
a network interface operable to couple to a packet-based network and to receive a call invite message at a called end point, the call invite message generated by a calling end point requesting a voice communication session with the called end point; and
a processor operable to, in response to the receipt of the call invite message by the called end point, wherein the called endpoint comprises a first web page loaded on the called endpoint and the first web page comprises a script that includes an event handler to implement a state for call processing:
determine a state of the calling end point by the called endpoint; and
execute, by the called endpoint, the event handler to communicate a second web page associated with the state of the calling end point from the called end point to the calling end point using the network interface;
wherein the state is associated with an event of the communication session and the second web page specifying user interface commands associated with the state of the calling end point for execution by the calling end point to present information to a user of the calling end point and to provide locally hosted telephony applications through the execution of the second web page.

11. The telephony device of claim 10, wherein:
the user interface commands indicate a plurality of options; and
the second web page further specifies a plurality of event handlers corresponding to the options, each of the event handlers operable to communicate an event in response to a selection of a corresponding option.

12. The telephony device of claim 11, wherein:
the network interface is further operable to receive a selected event from the calling end point in response to the user selecting one of the options, the selected event indicating the selected option; and
the processor is further operable to identify an event handler of a loaded web page corresponding to the selected event and to execute the event handler of the loaded web page.

13. The telephony device of claim 11, wherein the options comprise a hang up option and a leave message option.

14. The telephony device of claim 13, wherein:
the processor is further operable to establish the voice communication session with the calling end point by communicating a call connect message to the calling end point using the network interface;
the network interface is further operable to receive an event from the calling end point corresponding to selection of the leave message option;
the processor is further operable, in response to the received leave message event, to identify a message prompt and to communicate the message prompt to the calling end point using the network interface; and
a memory of the telephony device is operable to receive an audio stream from the calling end point and to record the audio stream.

15. The telephony device of claim 14, wherein the message prompt comprises an audio file.

16. The telephony device of claim 14, wherein the processor is further operable, in response to receiving the event, to communicate a third web page to the calling end point using the network interface, the third web page comprising user interface commands for presenting message options to the user.

17. The telephony device of claim 10, wherein the processor is further operable to:
identify an identity of the calling end point;
customize the user interface commands to indicate a plurality of options based on the identity of the calling end point; and
customize the second web page to include a plurality of event handlers corresponding to the options, each of the event handlers operable to communicate an event in response to a selection of a corresponding option.

18. The telephony device of claim 10, wherein the processor is further operable to:
handle the call invite message using a call invite event handler of in the script of the first web page loaded on the called endpoint, the call invite event handler including a link to a called web page;
load the called web page on the called endpoint, the called web page commanding output indicating an incoming call and initiating a timer for detecting failure to respond to the call;
receive a timeout event based on triggering of the timer;
handle the timeout event using a timeout event handler of the called web page, the timeout event handler linking to a no-answer web page;
load the no-answer web page, the no-answer web page specifying the communication of the web page to the calling end point.

19. A non-transitory computer-readable medium comprising logic for hosting telephony applications within end points, the logic, when executed by a processor, operable to:
receive a call invite message at a called end point, the call invite message generated by a calling end point requesting a voice communication session with the called end point; and
in response to the receipt of the call invite message by the called end point, wherein the called endpoint comprises a first web page loaded on the called endpoint and the first web page comprises a script that includes an event handler to implement a state for call processing:
determine a state of the calling end point by the called endpoint; and
execute, by the called endpoint, the event handler to communicate a second web page associated with the state of the calling end point from the called end point to the calling end point;
wherein the state is associated with an event of the communication session and the second web page specifying user interface commands associated with the state of the calling end point for execution by the calling end point to present information to a user of the calling end point and to provide locally hosted telephony applications through the execution of the second web page.

20. The non-transitory computer-readable medium of claim 19, wherein:
the user interface commands indicate a plurality of options; and
the second web page further specifies a plurality of event handlers corresponding to the options, each of the event handlers operable to communicate an event in response to a selection of a corresponding option.

21. The non-transitory computer-readable medium of claim 20, further operable to:
receive a selected event from the calling end point in response to the user selecting one of the options, the selected event indicating the selected option;
identify an event handler of a loaded web page corresponding to the selected event; and
execute the event handler of the loaded web page.

22. The non-transitory computer-readable medium of claim 20, wherein the options comprise a hang up option and a leave message option.

23. The non-transitory computer-readable medium of claim 22, further operable to:
communicate a call connect message to the calling end point;
establish the voice communication session with the calling end point;
receive an event from the calling end point corresponding to selection of the leave message option;
identify a message prompt;
communicate the message prompt to the calling end point;
receive an audio stream from the calling end point through the voice communication session; and
record the audio stream.

24. The non-transitory computer-readable medium of claim 23, wherein the message prompt comprises an audio file.

25. The non-transitory computer-readable medium of claim 23, further operable, in response to receiving the event, to communicate a third web page to the calling end point, the third web page comprising user interface commands for presenting message options to the user.

26. The non-transitory computer-readable medium of claim 19, further operable to:
identify an identity of the calling end point;
customize the user interface commands to indicate a plurality of options based on the identity of the calling end point; and
customize the second web page to include a plurality of event handlers corresponding to the options, each of the event handlers operable to communicate an event in response to a selection of a corresponding option.

27. The non-transitory computer-readable medium of claim 19, further operable to:
handle the call invite message using a call invite event handler of in the script of the first web page loaded on the called endpoint, the call invite event handler including a link to a called web page;
load the called web page on the called endpoint, the called web page commanding output indicating an incoming call and initiating a timer for detecting failure to respond to the call;
receive a timeout event based on triggering of the timer;
handle the timeout event using a timeout event handler of the called web page, the timeout event handler linking to a no-answer web page;
load the no-answer web page, the no-answer web page specifying the communication of the web page to the calling end point.

28. A telephony device comprising:
means for generating audio output;
means for receiving audio input from a user;
means for receiving indications from the user;
means for coupling to a packet-based network to receive a call invite message at a called end point, the call invite message generated by a calling end point requesting a voice communication session with the called end point; and
means for, in response to the receipt of the call invite message by the called end point, wherein the called endpoint comprises a first web page loaded on the called endpoint and the first web page comprises a script that includes an event handler to implement a state for call processing:
determining a state of the calling end point by the called endpoint; and
executing, by the called endpoint, the event handler to communicate a second web page associated with the state of the calling end point from the called end point to the calling end point;
wherein the state is associated with an event of the communication session and the second web page specifying user interface commands associated with the state of the calling end point for execution by the calling end point to present information to a user of the calling end point and to provide locally hosted telephony applications through the execution of the second web page.

* * * * *